F. W. FORT.
NUTCRACKER.
APPLICATION FILED MAR. 30, 1916.
1,201,953.
Patented Oct. 17, 1916.
2 SHEETS—SHEET 1.
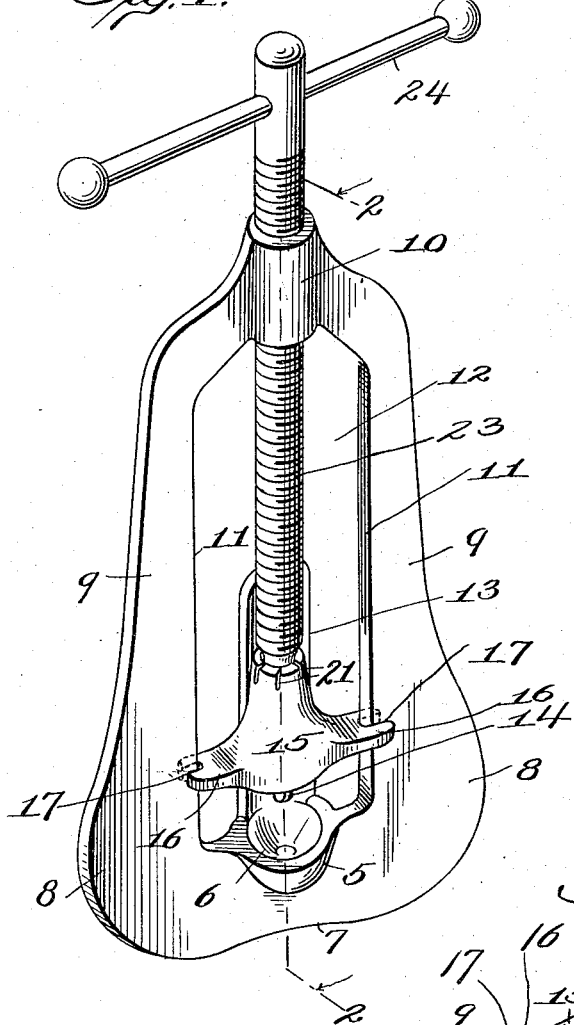
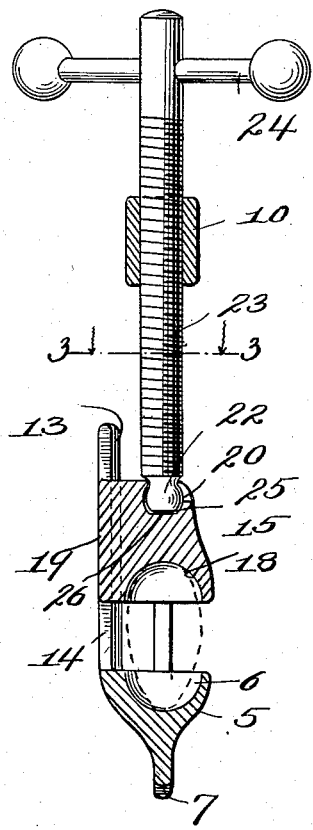
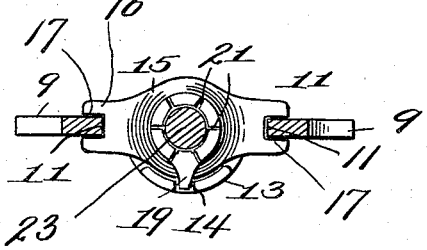
Witness
C. F. Kesler
Chas. S. Hyer
Inventor
Foster W. Fort
By
James L. Norris
Attorney

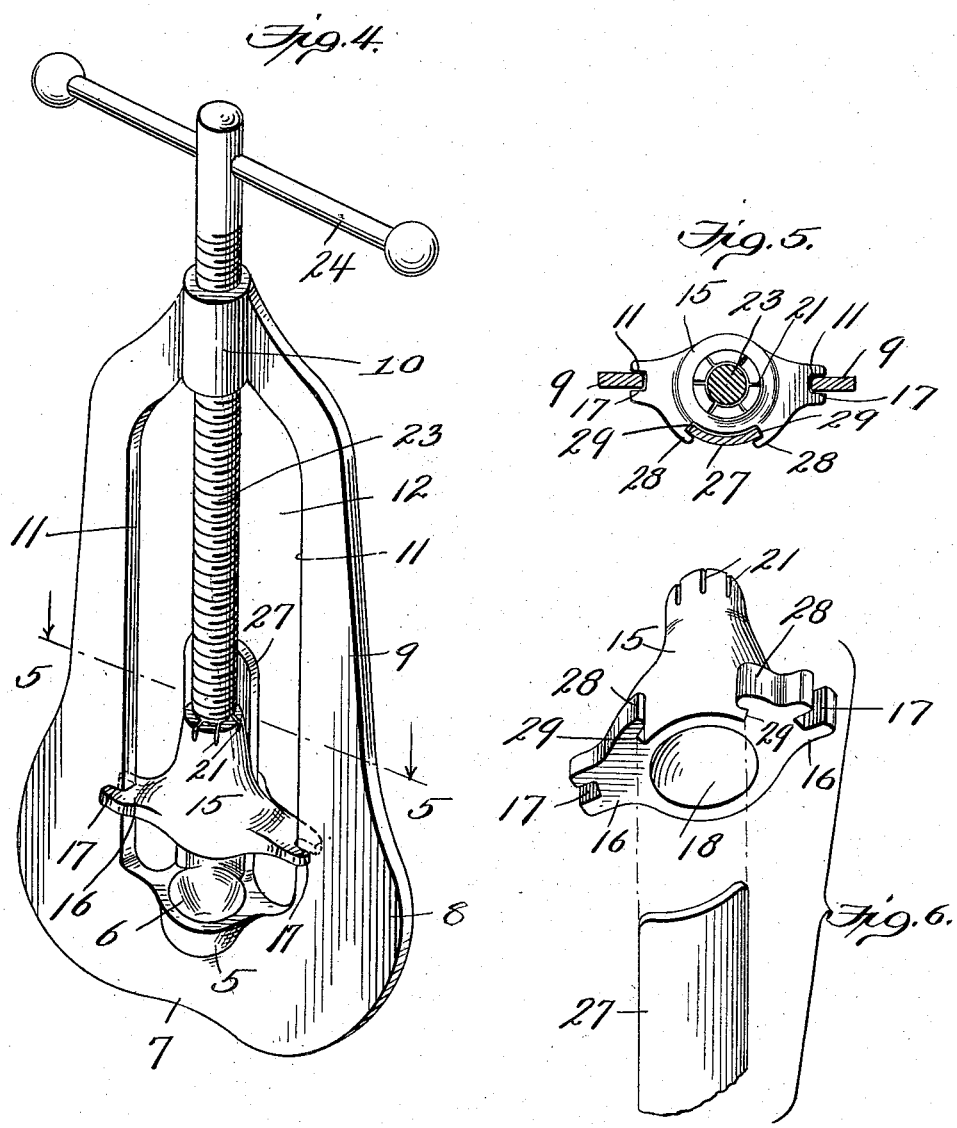

UNITED STATES PATENT OFFICE.

FOSTER W. FORT, OF WACO, TEXAS.

NUTCRACKER.

1,201,953.  Specification of Letters Patent.  Patented Oct. 17, 1916.

Application filed March 30, 1916. Serial No. 87,772.

*To all whom it may concern:*

Be it known that I, FOSTER W. FORT, a citizen of the United States, residing at Waco, in the county of McLennan and State of Texas, have invented new and useful Improvements in Nutcrackers, of which the following is a specification.

This invention relates to nut crackers of that type particularly adapted for cracking nuts that are round or oblong and whereby the nuts are broken or caused to bulge at an intermediate point to permit the kernels or meats thereof to be removed in unbroken or whole condition.

The improved nut cracker involves in its organization a relatively fixed or stationary jaw and a movable jaw or head, the latter being operable by a screw so that the movable jaw may be shifted toward the fixed or stationary jaw to a readily controllable degree necessary to break or crack a nut as contradistinguished from that class of nut crackers having an operating lever which is generally overthrown and very difficult to control to avoid excessive movement of the operative jaw which causes the breaking of the kernel or meat of the nut.

The present invention constitutes an improvement on the structure disclosed by U. S. Patent No. 964,414, granted to Foster W. Fort and Harry T. Cruger, July 12, 1910.

The present invention embodies as an essential feature a nut holding trough or guide projecting inwardly into the body of the nut cracker and extending only partially throughout the length of the latter and engaged by a portion of the movable jaw or head to provide a bracing action between the trough or guide and the said movable head, and also means for positively directing the sliding operation of the movable head relatively to the said trough or guide.

The nut cracker herein disclosed is of that type which is held in the hand of the operator or user while cracking a nut, in a manner similar to the device disclosed by the above noted patent. The nut holding trough, guide or trench forming one of the features of the improvement performs two important functions; first, to hold the nut in place at a point adjacent to the fixed jaw for engagement by the movable jaw, the latter jaw being guided in its movement by means other than the said trough, guide or trench; and, second, to shield or protect the hand of the operator when cracking a nut. The shortened length of the trough, guide or trench renders the nut cracker less cumbersome in its structure and permits it to be conveniently held in the hand and at the same time for more expeditiously and reliably cracking a nut.

The improvement also embodies features of construction and arrangement of the several parts which will be more fully hereinafter described and claimed.

In the drawings: Figure 1 is a perspective view of a nut cracker embodying the features of the invention. Fig. 2 is a longitudinal section taken in the plane of the line 2—2, Fig. 1. Fig. 3 is a cross-section taken in the plane of the line 3—3, Fig. 2. Fig. 4 is a view similar to Fig. 1 illustrating a modification of the structure of the nut cracker. Fig. 5 is a section taken in the plane of the line 5—5, Fig. 4. Fig. 6 illustrates detail perspective views of the form of sliding jaw or head shown by Fig. 4 in reverse position and a part of the trough or guide as used in the modified structure.

The nut cracker represented in the drawings includes in its construction, in both forms illustrated, a relatively fixed or stationary jaw 5 which is formed with a concavity 6 fully open toward the inner portion of the nut cracker, the said jaw being a part of or secured to a frame 7 near one end of the said frame. The frame 7 adjacent to the jaw has transversely extending wings 8 continuous with side members 9 which converge at their opposite extremities or are connected to an interiorly threaded bearing or sleeve 10, the inner opposing edges 11 of the side members 9 being longitudinally straight and parallel and providing side walls for an open space 12.

Extending toward the inner portion of the nut cracker is a segmental trough or guide 13 which projects from the rear portion of the fixed head 5, and in the form of the improvement as shown by Figs. 1, 2 and 3 this trough or guide 13 is longitudinally slotted, as at 14.

Between the side members 9 of the body or frame of the nut cracker a movable head 15 is mounted for longitudinal sliding actuation, the said head 15 being readily shiftable in reverse directions within the open space 12 and formed with laterally projecting arms 16 terminally slotted as at 17 to embrace the inner straight edges 11 of the members 9. The movable or shiftable head 15 also has a concavity 18 formed in its outer portion, as clearly shown by Fig. 2, and of a contour similar to the concavity 6 of the head 5.

It will be seen that the trough or guide 13 extends only partially throughout the length of the body or frame of the nut cracker and centrally in relation to the space 12, and the movable head or jaw 15 has a longitudinally extending spline or projection 19 at the rear portion thereof which is adapted to move loosely in the slot 14 of the trough or guide 13; and by this means the movable head or jaw 15 and the trough or guide 13 are relatively reinforced and the head or jaw centered in its movement so that the concavity 18 thereof will be shifted in alinement with the concavity 6 of the jaw 5. The trough or guide 13 serves to hold the nut to be cracked, the nut being moved along the trough and the two ends thereof forced into the concavities 6 and 18 of the two heads or jaws 5 and 15 as the head or jaw 15 is shifted or gradually fed toward the head or jaw 5.

The rear or upper end of the head or jaw 15 is formed with a socket 20 and the metal therearound is slotted, as at 21, to permit the inlet of the said socket to be closed or contracted relatively to the normal maximum diameter thereof in relation to a projection or swivel end 22 of a screw rod 23 which works in the sleeve or fixed collar 10 and has a hand bar or lever 24 on the free end thereof or inserted through the said end as shown and whereby the said screw rod or stem 23 may be caused to progress or recede relatively to the sleeve or collar 10 and correspondingly move the head or jaw 15. The projection or swivel end or head 22 of the screw rod or stem 23 is flattened, as at 25, to engage a corresponding flattened end wall 26 of the socket 20 so as to provide a square and positive bearing of the projection or swivel end 22 against the wall 26, particularly when the jaw or head 15 is being adjusted forwardly or toward the jaw or head 5 for the purpose of cracking a nut.

The modified structure of the improved nut cracker as shown by Figs. 4, 5 and 6 is the same in essential particulars or features of construction as the nut cracker shown by Figs. 1, 2 and 3, and similar reference characters are applied to corresponding parts. The differences in construction and involving the modification of the nut cracker, however, consist in forming a trough or guide 27 without a slot and in omitting from the jaw or head 15 the projection or spline 19. In lieu of the projection or spline 19 the head 15 has a pair of inwardly extending opposed lugs 28 which are undercut or grooved, as at 29, to engage the opposite side edges of the trough or guide 27 and reinforce and brace the latter as well as center the movement of the head or jaw 15 during the operation of the latter in cracking a nut. It will be understood that the distance between the outer walls of the undercuts or grooves 29 is slightly greater than the width of the trough or guide 27, but the inward extent of the overhanging portions of the said lugs 28 is less than the width of the trough or guide 27, and hence when the said trough or guide has its opposite side edge portions in engagement with the undercuts or grooves 29 it cannot move away from a normal position and is reinforced against strain or breakage.

The trough or guide 13 or 27 shields the hand of the user of the nut cracker against injury by the nut being cracked, and the improved device in its two forms is adapted to be rested in one hand and positively held by grasping the wings 8 adjacent to the jaw or head 5 and the head or jaw 15 then drawn backwardly through a proper movement of the screw rod or stem 23 until enough space is provided to accommodate the length of the nut to be cracked. The nut is then placed in the trough or guide 27 and the movement of the screw rod or stem 23 is reversed so as to cause the jaw or head 15 to be shifted or gradually moved with a sliding action toward the fixed jaw or head 5, and during this latter operation the nut is picked up and the two ends thereof are automatically seated in the concavities 6 and 18 and the screw stem or rod 23 is rotated to move the jaw or head 15 toward the jaw or head 5 until the nut is thoroughly cracked or bulges in the center. During this operation of cracking a nut the latter is braced against the trough or guide 13 or 27 and the hand of the operator is shielded, and contact of the broken edges of the shell with the hand of the operator is prevented. After the nut has been cracked to the required degree the jaw or head 15 is operated to recede from the jaw or head 5 and the nut may then be readily removed.

Though it is preferred that the nut cracker be placed in flat position within the hand of the operator or user, it will be understood that other positions thereof may be adopted as may be desired.

All the parts of the nut cracker in either of its forms are preferably made of metal to render the same strong and durable and it is intended to plate the metal parts so as to produce a smooth and ornamental or pleasing appearance. The movable head in the two forms of the device by means of either the projection or spline 19 or the grooved lugs 28 is held in perfect alinement relatively to the head or jaw 5, and at the same time the hand of the operator is shielded and protected through the medium of the trough, guide or trench which extends partially throughout the length of the improved cracker. It is impossible for the movable jaw or head 15 to wabble or become laterally displaced while cracking a nut and it has been found that the more perfect the alinement of the nuts to be cracked relatively to the two heads or jaws 5 and 15, the more efficient the work that can be accomplished.

It is proposed to construct the nut cracker in various sizes and to use any material in the manufacture of the same that may be best adapted for the purpose.

What is claimed is:

1. A nut cracker comprising a frame having a fixed jaw with a concavity and a trench extending partially over the length of the frame and clear of the main portion of said frame, a slidable jaw movable toward and from the fixed jaw and also having a concavity, the slidable jaw being provided with means movably engaging portions of the frame and also with centering means engaging a part of said trench, and means for operating the slidable jaw.

2. A nut cracker comprising a relatively stationary and a movable jaw, the two jaws being provided with complemental nut receiving concavities, and a fixed trench, the movable jaw provided with means to engage portions of the frame and other means to engage the trench.

3. A nut cracker which is held in the hand when operated comprising a frame, a relatively stationary and a movable jaw, the two jaws being provided with complemental nut receiving concavities, and a fixed nut holding trench extending inwardly partway over the length of the frame from one end of the latter to guide a nut relatively to the stationary jaw and to shield the hand of the operator.

4. A nut cracker which is held in the hand when operated comprising a frame, a relatively stationary and a movable jaw, the two jaws being provided with complemental nut receiving concavities, a fixed nut holding trench extending inwardly partway over in suspended relation to the frame for coöperation with the movable jaw to guide a nut relatively to the stationary jaw and to shield the hand of the operator.

5. A nut cracker which is held in the hand when operated comprising a frame, relatively stationary and movable recessed jaws and a fixed suspended nut holding trench of less length than the frame and engageable by the movable jaw during part of the operation of the latter jaw to support the trench when under strain due to the cracking pressure on the nut by the said movable jaw.

6. A nut cracker comprising a frame with a recessed fixed jaw at one end and an open space and side members, a fixed nut holding trench extending inwardly from the fixed jaw partway of the length of the frame, a movable recessed jaw having means slidably engaging the side members of the frame within said space and other means to engage the trench, and means for operating the movable jaw.

7. A nut cracker comprising a frame with a recessed fixed jaw at one end and an open space and side members, a fixed nut holding trench extending inwardly from the fixed jaw partway of the length of the frame, a movable recessed jaw having means slidably engaging the side members of the frame within said space and other projecting means to engage the trench, and an operating screw stem swiveled to the movable jaw for shifting the latter lengthwise of the frame.

8. A nut cracker comprising a frame with a fixed recessed jaw at one end and side members with an open space therebetween, a nut holding trench extending from the fixed jaw in central relation to and partway of the length of said open space, a movable recessed jaw disposed in said open space and having means at opposite sides slidably engaging said side members and other projections to engage the opposite side edges of the trench, and means for operating said movable jaw.

9. A nut cracker comprising a frame with a recessed fixed jaw at one end and side members having an open space therebetween, a nut holding trench extending in central relation to said space from the fixed jaw partway of the length of the frame, a movable recessed jaw mounted in the space and having means slidably engaging said side members and rear inwardly projecting undercut lugs to engage opposite side edges of the trench, and means for operating said movable jaw.

10. A nut cracker comprising a frame having a fixed recessed jaw and a nut holding trench extending partway over the length of the frame, a recessed movable jaw having means slidably engaging opposite portions of the frame and rear inwardly projecting undercut lugs to engage opposite side edge portions of the trench, and means for operating the movable jaw.

In testimony whereof I have hereunto set my hand in presence of two subscribing witnesses.

FOSTER W. FORT.

Witnesses:
EMMETT S. DEAN,
KATIE A. KINNARD.

Copies of this patent may be obtained for five cents each, by addressing the "Commissioner of Patents, Washington, D. C."